United States Patent [19]

Vogt et al.

[11] Patent Number: 4,652,422

[45] Date of Patent: Mar. 24, 1987

[54] SUPPORTING DEVICE FOR AN ELONGATED NUCLEAR REACTOR FUEL ELEMENT AND/OR AN ELONGATED NUCLEAR REACTOR FUEL ELEMENT PART

[75] Inventors: Manfred Vogt, Limeshain; Hans-Peter Schönwitz, Grosskrotzenburg; Walter Dassbach, Hanau, all of Fed. Rep. of Germany

[73] Assignee: Reaktor Brennelement Union GmbH, Hanau, Fed. Rep. of Germany

[21] Appl. No.: 577,275

[22] Filed: Feb. 6, 1984

[30] Foreign Application Priority Data

Feb. 7, 1983 [DE] Fed. Rep. of Germany ....... 3304078

[51] Int. Cl.[4] ............................................. G21C 19/00
[52] U.S. Cl. ................................ 376/272; 250/506.1; 376/363
[58] Field of Search ......................... 376/269, 272, 363; 250/506.1; 252/633

[56] References Cited

U.S. PATENT DOCUMENTS 2,894,893  7/1959  Carney, Jr. ......................... 376/363
2,954,335  9/1960  Wigner .............................. 376/272
3,163,585  12/1964  Metcalfe et al. ..................... 376/363
4,016,749  4/1977  Wachter ............................. 376/272
4,287,426  9/1982  Anthony ............................. 376/272

FOREIGN PATENT DOCUMENTS 1514389  7/1969  Fed. Rep. of Germany ... 250/506.1
2722870  11/1978  Fed. Rep. of Germany ...... 376/272
2836931  3/1980  Fed. Rep. of Germany ... 250/506.1
1420588  11/1965  France ................................. 376/272

Primary Examiner—Deborah L. Kyle
Assistant Examiner—Richard W. Wendtland
Attorney, Agent, or Firm—Herbert L. Lerner; Laurence A. Greenberg

[57] ABSTRACT

A supporting device for a member formed of at least part of an elongated nuclear reactor fuel element, the supporting device having an elongated receiving sleeve mounted vertically on a base surface and having an upper end formed with an opening and a holding device located at the upper end of the sleeve for suspending the member inside the receiving sleeve includes a removable cover closing the opening at the upper end of the receiving sleeve, the holding device being secured to the inside of the cover.

4 Claims, 3 Drawing Figures

SUPPORTING DEVICE FOR AN ELONGATED NUCLEAR REACTOR FUEL ELEMENT AND/OR AN ELONGATED NUCLEAR REACTOR FUEL ELEMENT PART

The invention relates to a supporting device for an elongated nuclear reactor fuel element and/or an elongated nuclear reactor fuel assembly, the supporting device having an elongated receiving sleeve vertically arranged and mounted on a base surface, and having an open upper end with which a holding device is associated for suspending the nuclear reactor fuel element or nuclear reactor fuel assembly inside the receiving sleeve.

A supporting device of this general type has already been proposed heretofore. The receiving sleeve of the heretofore proposed supporting device is secured at the edge of the opening at the upper end thereof by a clamp to the edge of the opening, at the upper end of another receiving sleeve, and if necessary or desirable to an arm which is located on a supporting post on the base surface. The holding device for suspending the nuclear reactor fuel assembly, respectively, is formed of a simple strap in the opening at the upper end of the receiving sleeve of the heretofore proposed supporting device.

It is an object of the invention of the instant application to provide a supporting device for an elongated component such as a nuclear reactor fuel element or nuclear reactor fuel assembly disposed in a receiving sleeve with improved protection against horizontal thrust forces and vertical compression or upsetting forces, such as can occur for example during earthquakes.

With the foregoing and other objects in view, there is provided, in accordance with the invention, a supporting device for a member formed of at least part of an elongated nuclear reactor fuel element, the supporting device having an elongated receiving sleeve mounted vertically on a base surface and having an upper end formed with an opening and a holding device located at the upper end of the sleeve for suspending the member inside the receiving sleeve, comprising a removable cover closing the opening at the upper end of the receiving sleeve, the holding device being secured to the inside of the cover.

The cover is, or has a part thereof advantageously fitted into and matching the opening at the upper end of the receiving sleeve or fits on the upper end so as to cover the opening, ensures the stability of form of the receiving sleeve when horizontal and vertical forces are applied thereto due to a disturbance such as an earthquake, for example, so that upsetting, compression or buckling of the nuclear reactor fuel element and nuclear reactor fuel assembly, respectively, freely suspended from the cover inside the receiving sleeve is avoided as much as possible.

In addition, the cover according to the invention also completely closes the opening at the upper end of the receiving sleeve so that the nuclear reactor fuel element or nuclear reactor fuel assembly that is freely suspended vertically from the cover in the receiving sleeve is not accessible from the outside and so is completely safe from damage, for example, by the careless handling of tools. Also, the cover at the opening formed in the upper end of the receiving sleeve ensures that no foreign matter can fall into this receiving sleeve and be deposited on parts of the nuclear reactor fuel element assembly, from which, under certain circumstances, it can be removed only at considerable expense or not at all.

In accordance with an added feature of the invention, the supporting device includes coupling means for a lifting and transporting device, the coupling means being secured to the outside of the cover.

In accordance with a concomitant feature of the invention, the supporting device includes a plurality of the receiving sleeves formed with a plurality of rigid lugs at the outer surface thereof, at least one of the rigid lugs of each of the receiving sleeves having a radially extending slot formed therein, and at least another of the rigid lugs of each of the receiving sleeves having an axially extending slot formed therein, a respective lug of one of the receiving sleeves formed with the radially extending slot being disposed adjacent a respective lug of another of the receiving sleeves formed with the axially extending slot so that respective parts of the slots thereof are in mutual alignment, and a retaining bolt extending through the parts of mutually aligned slots and connecting the respective lugs to one another. In this way, a union or complex of vertically arranged receiving sleeves which is stable per se, is attained, wherein horizontally directed disturbance forces, which occur especially during earthquakes, are compensated, so that they do result in buckling of the nuclear reactor fuel elements suspended in the receiving sleeves.

Other features, which are considered as characteristic for the invention, are set forth in the appended claims.

Although the invention is illustrated and described herein as embodied in a supporting device for an elongated nuclear reactor fuel element and/or an elongated nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is an enlarged fragmentary view of FIG. 1 showing respective lugs of two adjacent sleeves in alignment.

Figure 1:
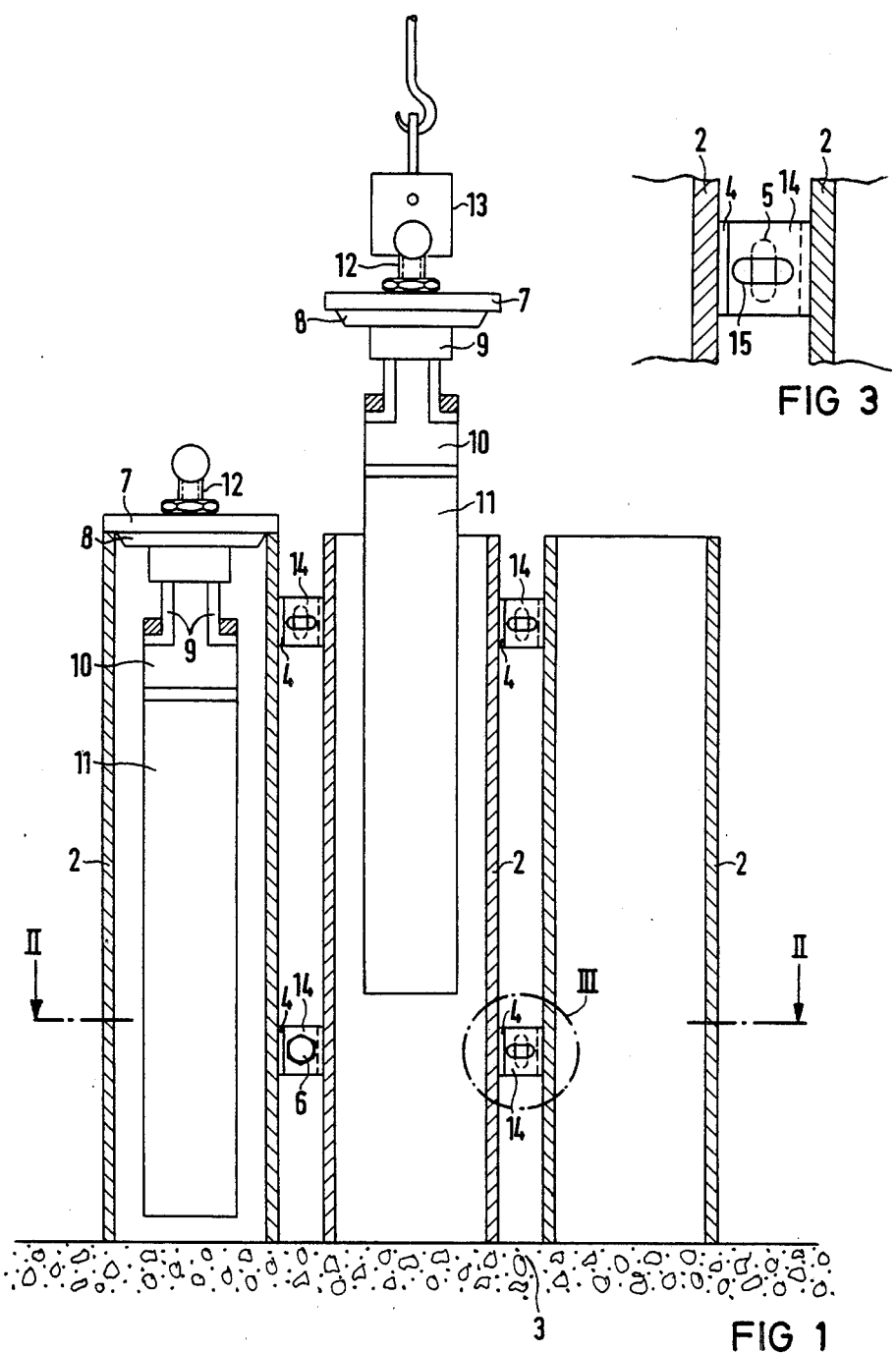
FIG. 1 is a diagrammatic longitudinal sectional view of a supporting device according to the invention.
Figure 2:
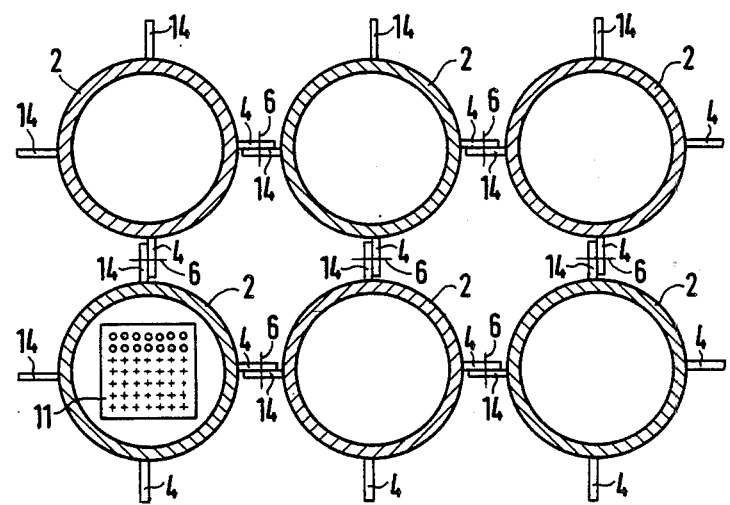
FIG. 2 is a cross-sectional view of FIG. 1 taken along the line II—II in the direction of the arrows.

Referring now to the drawing and first, particularly to FIGS. 1 and 2 thereof, there are shown six receiving sleeves 2 of the supporting device according to the invention which have a circular cross section and stand upright on a horizontal flat base surface 3 so that the longitudinal axis thereof is vertical. These sleeves 2 may also have an angular, such as a square, cross section.

Outside, on the outer or jacket surface, these receiving sleeves 2 respectively have, in two cross sectional planes at a distance from one another, four rigid lugs 4 and 14 which are arranged in the respective cross-sectional plane in stellar fashion at an angular spacing of 90 from one another. A respective group of four of these rigid lugs 4 and 14 is arranged in the same longitudinal plane through the longitudinal axis of the appertaining receiving sleeve 2. In each rigid lug 4 or 14, there is formed a slot 5 and 15, respectively, which extends in the axial or radial direction, respectively, with regard to the receiving sleeves 2. The rigid lugs 4 and 14 of two adjacent receiving sleeves 2 are connected to one another with the aid of a screw bolt 6 which extends through the slots 5 and 15 of the appertaining two rigid lugs 4 and 14 and is screwed tightly against these two rigid lugs 4 and 14. As shown more clearly in FIG. 3, the slot 5 in the lug 4 has its longer dimension extending in the axial direction of the respective receiving sleeve 2, and the slot 15 in the lug 14 has its longer dimension extending in the radial direction of the respective receiving sleeve 2.

The opening at the upper end of one of the receiving sleeves 2 of the support device according to FIGS. 1 and 2 is closed with a cover 7 which lies on the flat surface at the respective end of the receiving sleeve 2 and has a centering, cylindrical fitting piece or part 8 which is received within the receiving sleeve 2 and thus is fitted in or matches with the opening. At the inside of the cover 7, there is further disposed on the fitting piece or part 8, a holding device with two actuatable gripper arms 9 which grip behind a head part 10 of a nuclear reactor fuel element 11 so that this nuclear reactor fuel element 11 is freely suspended from the cover 7 inside the receiving sleeve 2. Because of the fuel effect of the intrinsic weight of the fuel element 11 on the cover 7, a secure closure of the opening formed at the upper end of the receiving sleeve 2 is ensured by this cover 7.

The holding device at the inside of the cover 7 can also be constructed in such a way that parts of a nuclear reactor fuel element, such as fuel rods or a control element, for example, can be coupled thereto in suspended fashion.

At the outside, the cover 7 has a coupling part 12 for a lifting and transporting device formed of a crane, with a coupling 13 suspended from a crane hook.

A nuclear reactor fuel element 11, which is suspended by its head 10 from the gripper 9 of a cover 7, can be lowered into a receiving sleeve 2, with the aid of the crane on the hook of which the cover 7 is suspended from the coupling 13, and inside this receiving sleeve 2, can be mounted in free suspension, after the cover 7 is lowered into the opening at the upper end of this receiving sleeve 2.

The receiving sleeves 2 and the covers 7 can be formed of fine or high-grade steel. To avoid a critical mass, it may also be advantageous if the receiving sleeves 2 and the covers 7 were formed of material having a high neutron absorption capability e.g. boron steel. The supporting devices according to FIGS. 1 and 2 can be set up in a dry storage room and can be used there especially for storing newly prepared unexposed nuclear reactor fuel elements or newly prepared unexposed nuclear reactor fuel assemblies. It can also be set up in a storage basin filled with water, however, and there, especially, it can receive exposed or irradiated nuclear reactor fuel elements or irradiated nuclear reactor fuel assemblies. It is especially advantageous if the receiving sleeves 2 are provided at both ends thereof with through passages for air (ventilating pass-throughs) and for water, which are not shown in the figures, however.

The foregoing is a description corresponding in substance to German Application No. P 33 04 078.8, dated Feb. 7, 1983, the International priority of which is being claimed for the instant application, and which is hereby made part of this application. Any material discrepancies between the foregoing specification and the aforementioned corresponding German application are to be resolved in favor of the latter.

We claim:

1. Device for supporting an elongated component of an elongated nuclear reactor fuel assembly, the supporting device having an elongated receiving sleeve mounted vertically on a base surface and having an upper end formed with an opening, and a holding device located at the upper end of the sleeve for suspending the elongated component inside the receiving sleeve, comprising a removable cover closing the opening at the upper end of the receiving sleeve partially lowered into said opening and lying on the flat surface of said upper end, the holding device being secured to the inside of the cover further including coupling means for a lifting and transporting device, said coupling means being secured to the outside of said cover.

2. Supporting device according to claim 1, wherein at least a part of said cover is fitted into and matches the opening at the upper end of the receiving sleeve.

3. Supporting device according to claim 1, wherein said cover has a downward facing cylindrical fitting part which fits inside the upper end of the receiving sleeve.

4. Supporting device assembly according to claim 1 including a plurality of the receiving sleeves formed with a plurality of rigid lugs at the outer surface thereof, at least one of the rigid lugs of each of said receiving sleeves having a radially extending slot formed therein, and at least another of the rigid lugs of each of said receiving sleeves having an axially extending slot formed therein, a respective lug of one of the receiving sleeves formed with said radially extending slot being disposed adjacent a respective lug of another of the receiving sleeves formed with said axially extending slot so that respective parts of said slots thereof are in mutual alignment, and a retaining bolt extending through said parts of mutually aligned slots and connecting the respective lugs to one another.

* * * * *